(12) United States Patent
Wu

(10) Patent No.: US 7,496,085 B2
(45) Date of Patent: *Feb. 24, 2009

(54) METHOD FOR HANDLING PERIODIC STATUS REPORT TIMER AFTER AN RLC RE-ESTABLISHMENT IN A WIRELESS COMMUNICATIONS SYSTEM

(75) Inventor: Chih-Hsiang Wu, Taipei Hsien (TW)

(73) Assignee: Innovative Sonic Limited, Tortola (VG)

( * ) Notice: Subject to any disclaimer, the term of this patent is extended or adjusted under 35 U.S.C. 154(b) by 0 days.

This patent is subject to a terminal disclaimer.

(21) Appl. No.: 11/564,305

(22) Filed: Nov. 29, 2006

(65) Prior Publication Data

US 2007/0115911 A1 May 24, 2007

Related U.S. Application Data

(63) Continuation of application No. 10/064,747, filed on Aug. 13, 2002, now Pat. No. 7,227,856.

(51) Int. Cl.
*H04J 3/16* (2006.01)
*H04J 3/14* (2006.01)

(52) U.S. Cl. ........................................ 370/350; 370/500

(58) Field of Classification Search ................. 370/350, 370/500
See application file for complete search history.

(56) References Cited

U.S. PATENT DOCUMENTS

| | | | |
|---|---|---|---|
| 6,363,058 B1 | 3/2002 | Roobol et al. | |
| 6,473,399 B1 | 10/2002 | Johansson et al. | |
| 6,862,450 B2 | 3/2005 | Mikola et al. | |
| 6,904,016 B2 | 6/2005 | Kuo et al. | |
| 6,947,394 B1 | 9/2005 | Johansson et al. | |
| 6,950,422 B2 | 9/2005 | Rinchiuso | |
| 6,978,413 B2 | 12/2005 | Han | |
| 7,155,261 B2 | 12/2006 | Chen | |
| 7,209,747 B2 | 4/2007 | Chen et al. | |
| 2001/0018342 A1* | 8/2001 | Vialen et al. | ................. 455/423 |
| 2001/0029188 A1* | 10/2001 | Sarkkinen et al. | ........... 455/517 |
| 2002/0042270 A1 | 4/2002 | Yi et al. | |
| 2002/0107019 A1 | 8/2002 | Mikola et al. | |
| 2003/0016698 A1 | 1/2003 | Chang et al. | |
| 2003/0092458 A1 | 5/2003 | Kuo | |
| 2003/0095519 A1 | 5/2003 | Kuo et al. | |

(Continued)

FOREIGN PATENT DOCUMENTS

| | | |
|---|---|---|
| WO | WO-97/04611 A1 | 2/1997 |
| WO | WO 01/47206 A2 | 6/2001 |

OTHER PUBLICATIONS

3GPP TS 25.322 V5.1.0 (Jun. 2002).

(Continued)

*Primary Examiner*—Andrew Lee
(74) *Attorney, Agent, or Firm*—Winston Hsu

(57) ABSTRACT

A method for handling a Timer_Status_Periodic timer in a wireless communications system includes starting the Timer_Status_Periodic timer for a Radio Link Control Acknowledged Mode (RLC AM) entity, performing a re-establishment procedure for the RLC AM entity, and not stopping the Timer_Status_Periodic timer after re-establishment of the RLC AM entity.

2 Claims, 4 Drawing Sheets

U.S. PATENT DOCUMENTS

| | | |
|---|---|---|
| 2004/0037327 A1 | 2/2004 | Torsner et al. |
| 2004/0042491 A1 | 3/2004 | Sarkkinen et al. |
| 2004/0071108 A1* | 4/2004 | Wigell et al. ............. 370/328 |
| 2004/0146033 A1* | 7/2004 | Soderstrom et al. ........ 370/338 |
| 2004/0203623 A1 | 10/2004 | Wu |
| 2004/0203971 A1 | 10/2004 | Kuo |
| 2006/0098574 A1 | 5/2006 | Yi et al. |
| 2007/0140491 A1 | 6/2007 | Yi |

OTHER PUBLICATIONS

Chuah, M C, et al., "Performance Comparisons of Two Retransmission Protocols for CDMA" IEEE, (1996), pp. 272-276.

Chan et al., Impacts of Handoff on TCP Performance in Mobile Wireless Computing, IEEE (1997), pp. 184-188.

Zhang et al., Performance of UMTS Radio Link Control, pp. 3346-3350, IEEE, 2002.

* cited by examiner

METHOD FOR HANDLING PERIODIC STATUS REPORT TIMER AFTER AN RLC RE-ESTABLISHMENT IN A WIRELESS COMMUNICATIONS SYSTEM

CROSS REFERENCE TO RELATED APPLICATIONS

This is a continuation application of application Ser. No. 10/064,747, filed Aug. 13, 2002, which is included in its entirety herein by reference.

BACKGROUND OF THE INVENTION

1. Field of the Invention

The present invention relates to a method for handling timers in a wireless communications system, and more specifically, to a method for handling a Timer_Status_Periodic timer after an RLC re-establishment in a wireless communications system.

2. Description of the Prior Art

Technological advances have moved hand in hand with more demanding consumer expectations. Devices that but ten years ago were considered cutting edge are today obsolete. These consumer demands in the marketplace spur companies towards innovation. The technological advances that result only serve to further raise consumer expectations. Presently, portable wireless devices, such as cellular telephones, personal digital assistants (PDAs), notebook computers, etc., are a high-growth market. However, the communications protocols used by these wireless devices are quite old. Consumers are demanding faster wireless access with greater throughput and flexibility. This has placed pressure upon industry to develop increasingly sophisticated communications standards. The 3rd Generation Partnership Project (3GPP) is an example of such a new communications protocol.

Please refer to FIG. 1. FIG. 1 is a simplified block diagram of the prior art communications model. In a typical wireless environment, a first station 10 is in wireless communications with one or more second stations 20. The first station 10 is comprised of upper layers 12, a radio link control (RLC) entity 14, and lower layers 16 which are below the RLC 14. In the following disclosure, all of the RLC entities are assumed to be RLC acknowledged mode (RLC AM) entities. The upper layers 12 can deliver messages to the RLC 14 through service data units (SDUs) 13. The SDUs 13 may be of any size, and hold data that the upper layers 12 wish delivered to the second station 20. The RLC 14 composes the SDUs 13 into one or more protocol data units (PDUs) 15. Each PDU 15 of the RLC 14 is of a fixed size, and is delivered to the lower layers 16. The lower layers 16 include the physical layer, which is in charge of transmitting data to the second station 20.

The second station 20 shown has exactly the same basic structure as the first station 10. The second station 20 also includes upper layers 22, an RLC 24, and lower layers 26. Just as with the first station 10, the second station 20 uses the upper layers 22 to transmit SDUs 23 to the RLC 24, and uses the RLC 24 to transmit PDUs 25 to the lower layers 26. The data transmitted by the first station 10 is received by lower layers 26 of the second station 20 and reconstructed into one or more PDUs 25, which are passed up to the RLC 24. The RLC 24 receives the PDUs 25 and from them assembles one or more SDUs 23, which are then passed up to the upper layers 22. The upper layers 22, in turn, convert the SDUs 23 back into messages, which should be identical to the original messages that were generated by the first station 10. In communication systems, the terms SDU and PDU have broad meanings. For purposes of the following disclosure, the term "SDU" is used to indicate SDUs passed from the upper layers to the RLC, and the term "PDU" should be understood as PDUs passed from the RLC to lower layers. In addition, for simplicity the following disclosure will be written from the perspective of the first station 10, unless otherwise noted.

The $3^{rd}$ Generation Partnership Project (3GPP) specification 3GPP TS 25.322 V3.11.0 "RLC Protocol Specification has defined parameters, variables, timers, control PDUs, etc., for operations of the first station 10 and the second station 20. According to the specification, in some circumstances, the RLC layers 14 and 24 must be re-established with an RLC re-establishment function. However, the specification does not specify how the timers should be handled during re-establishment. Due to this lack of guidelines, potential problems could develop due to the improper use of the timers.

Please refer to FIG. 2. FIG. 2 is a phase diagram illustrating a transmission window of an RLC AM entity according to the prior art. During normal operation, the RLC AM entity 14 (transmitter) transmits acknowledged mode data (AMD) PDUs to the RLC AM entity 24 (receiver), and each PDU is marked with a sequence number (SN). The SNs have a fixed bit length of n bits. In the preferred embodiment, the bit length n is 12. Hence, the SNs have a range of values from zero to 4095 ($2^{12}-1$). The phase diagram for SNs can thus be represented by a circle. For the following example, point 30 is the sequentially lowest transmitter PDU SN value waiting for acknowledgment from the receiver in the form of a STATUS PDU, which contains information on which PDUs have been acknowledged. In other words, point 30 marks the beginning of the transmitting window. In this example, assume a window size=X. Point 32 marks the highest PDU SN value of an AMD PDU that has been sent so far. Therefore, in order to prevent the transmitting window from filling up, the difference of PDU SN values at point 32 and point 30 has to be less than X. Otherwise, the transmitting window fills up, and deadlock occurs. Deadlock can occur if AMD PDUs sent from the transmitter to the receiver are not properly acknowledged by the receiver. This would cause point 30 to remain stationary, and the difference between point 32 and point 30 would eventually equal the maximum window size of X.

As mentioned in the specification 3GPP TS 25.322 V3.11.0, a Timer_Status_Periodic timer is used by the RLC AM entity 24 to send STATUS PDUs to its peer RLC AM entity 14. When the Timer_Status_Periodic timer of the RLC AM entity 24 expires, a STATUS PDU is generated and sent to the RLC AM entity 14. This STATUS PDU informs the RLC AM entity 14 which AMD PDUs have been acknowledged. Since the specification does not specify how the Timer_Status_Periodic timer should be handled during re-establishment, the Timer_Status_Periodic timer may be stopped by the RLC entity upon reception of a re-establishment request, and never restarted after the re-establishment procedure. Therefore, the Timer_Status_Periodic timer does not ever get started again, and cannot trigger a poll to the peer RLC AM entity 14 upon expiration of the timer. This means that AMD PDUs with lower SN values indicated by point 30 in FIG. 2 will never be acknowledged. Since point 30 never moves, eventually the difference between point 32 and point 30 will equal the transmission window size of X. Thus, because the timer remains stopped, deadlock occurs, and the RLC AM entity 24 cannot transmit additional PDUs to the peer RLC AM entity 14.

Therefore, since the current 3GPP specification does not specify how the Timer_Status_Periodic timer should be handled during re-establishment, deadlock can occur and quality of service may be reduced substantially.

SUMMARY OF THE INVENTION

It is therefore a primary objective of the claimed invention to provide a method for handling a Timer_Status_Periodic timer after an RLC re-establishment in a wireless communications system in order to solve the above-mentioned problems.

According to the claimed invention, a method for handling a Timer_Status_Periodic timer in a wireless communications system includes starting the Timer_Status_Periodic timer for a Radio Link Control Acknowledged Mode (RLC AM) entity, performing a re-establishment procedure for the RLC AM entity, and not stopping the Timer_Status_Periodic timer after re-establishment of the RLC AM entity.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
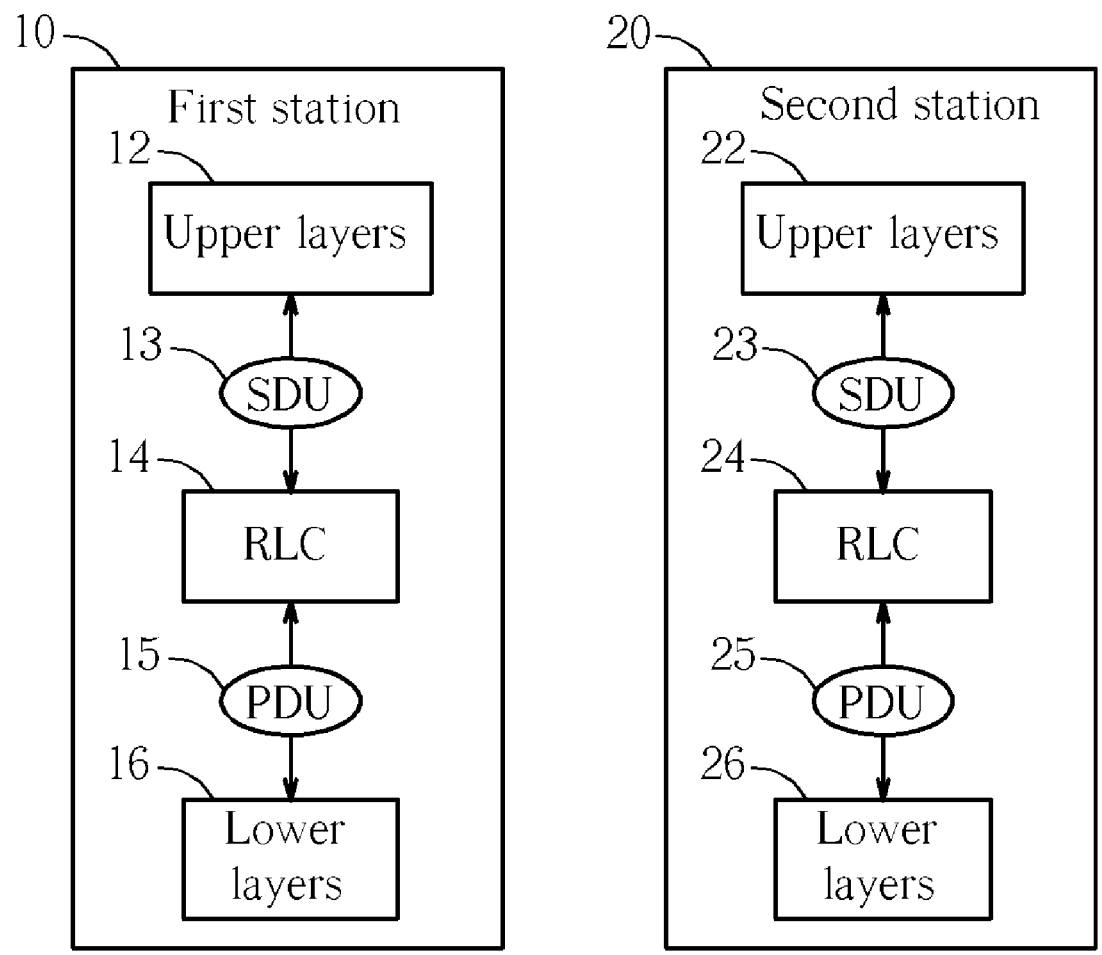
FIG. 1 is a simplified block diagram of the prior art communications model.
Figure 2:
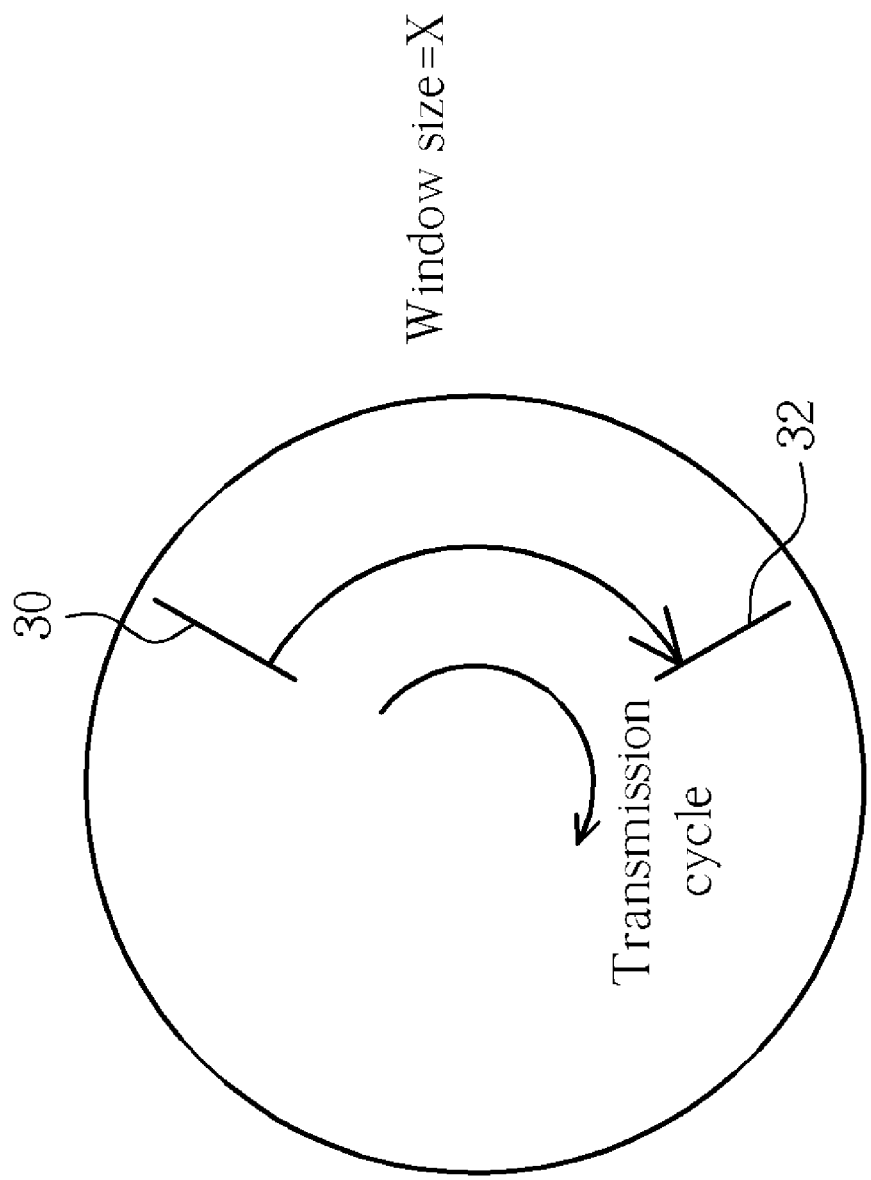
FIG. 2 is a phase diagram illustrating a transmission window of an RLC AM entity according to the prior art.
Figure 3:
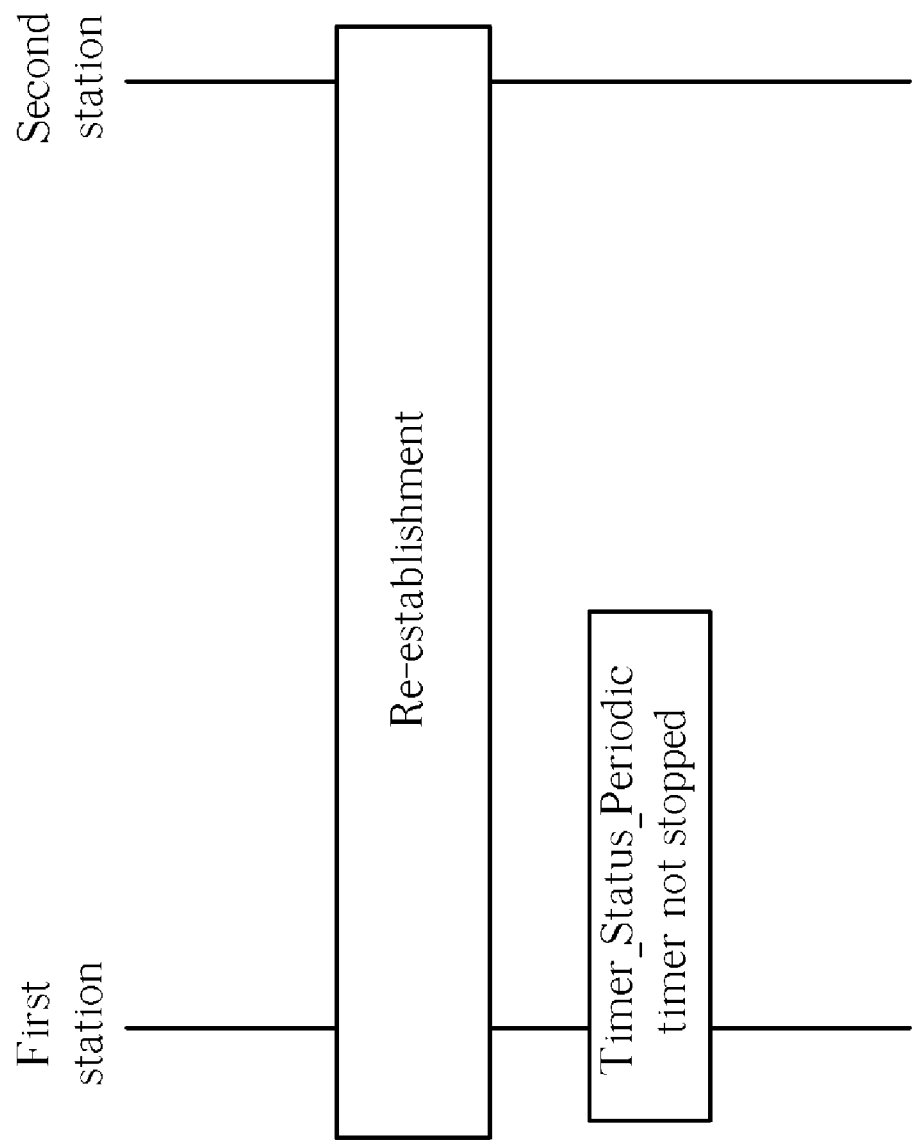
FIGS. 3 and 4 are message sequence charts illustrating handling of the Timer_Status_Periodic timer during a re-establishment function according to the present invention.
Figure 4:
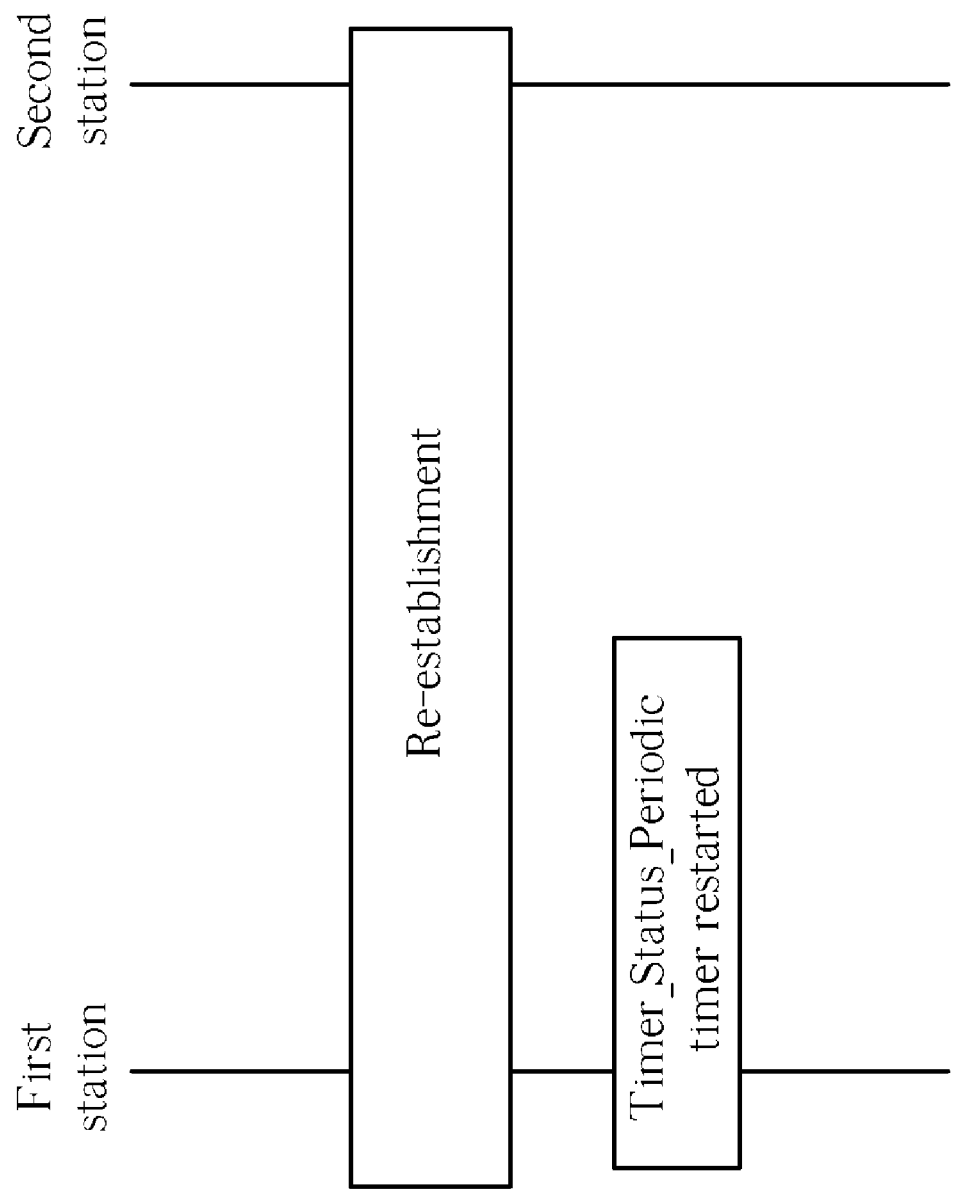

Please refer to FIGS. 3 and 4. FIGS. 3 and 4 are message sequence charts illustrating handling of the Timer_Status_Periodic timer during a re-establishment function according to the present invention. After the RLC AM entity 14 is re-established by upper layers, the present invention method includes not stopping the Timer_Status_Periodic timer as shown in FIG. 3. Alternately, as shown in FIG. 4, the present invention method includes restarting the Timer_Status_Periodic timer.

Thus, for a re-establishment function, the handling of the Timer_Status_Periodic timer can be summarized as follows: after re-establishment, the Timer_Status_Periodic timer is not stopped or is restarted. By not stopping or restarting the Timer_Status_Periodic timer, the RLC AM entity 14 will continue to be able to send STATUS PDUs to its peer RLC AM entity 24 after the RLC AM entity 14 has been re-established, and will prevent deadlock from occurring.

Compared to the prior art, the present invention provides steps for handling the Timer_Status_Periodic timer after re-establishment of the RLC AM entity. Therefore, the present invention will prevent RLC AM entities from experiencing deadlock, and will help maintain the quality of service.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for handling a Timer_Status_Periodic timer in a wireless communications system, the method comprising:
    starting the Timer_Status_Periodic timer for a Radio Link Control Acknowledged Mode (RLC AM) entity;
    performing a re-establishment procedure for the RLC AM entity; and
    not stopping the Timer_Status_Periodic timer after re-establishment of the RLC AM entity.

2. The method of claim 1 further comprising maintaining a value of the Timer_Status_Periodic timer and maintaining operation of the Timer_Status_Periodic timer after re-establishment of the RLC AM entity.

* * * * *